(12) United States Patent
Asano

(10) Patent No.: US 6,826,261 B2
(45) Date of Patent: Nov. 30, 2004

(54) SUBSCRIBER TESTING SYSTEM

(75) Inventor: Hiroyuki Asano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 598 days.

(21) Appl. No.: 09/815,843

(22) Filed: Mar. 22, 2001

(65) Prior Publication Data
US 2001/0013106 A1 Aug. 9, 2001

Related U.S. Application Data

(63) Continuation of application No. PCT/JP99/00179, filed on Jan. 20, 1999, now abandoned.

(51) Int. Cl.[7] .............................................. H04M 3/22
(52) U.S. Cl. .............................. 379/27.01; 379/26.01; 379/29.01
(58) Field of Search .............................. 379/1.01, 1.04, 379/9, 9.06, 15.01, 15.02, 28, 22.04, 26.01, 27.01, 27.07, 29.01; 370/389, 400, 352

(56) References Cited

U.S. PATENT DOCUMENTS

| | | | |
|---|---|---|---|
| 5,974,030 A | * 10/1999 | Tiihonen et al. | 370/241 |
| 6,259,676 B1 | * 7/2001 | Kellock et al. | 370/248 |
| 6,647,018 B1 | * 11/2003 | Juntunen et al. | 370/420 |
| 6,738,455 B1 | * 5/2004 | Miyagawa | 379/27.01 |
| 2002/0021710 A1 | * 2/2002 | Bold et al. | 370/442 |

FOREIGN PATENT DOCUMENTS

| | | |
|---|---|---|
| JP | 01175348 | 7/1989 |
| JP | 05083376 | 4/1993 |
| JP | 07321916 | 12/1995 |
| JP | 06006452 | 1/1997 |

* cited by examiner

Primary Examiner—Curtis Kuntz
Assistant Examiner—Barry W Taylor
(74) Attorney, Agent, or Firm—Katten Muchin Zavis Rosenman

(57) ABSTRACT

In a subscriber testing system, a V5 interface protocol is used as a communication protocol. A switch includes a processing unit for transmitting to a communication node a piece of test specifying information, inputted from a maintenance/operation terminal, for indicating a subscriber test for a subscriber's line and subscriber circuit that correspond to an accommodated subscriber by use of specifying information of a message type based on the V5 interface protocol. The communication node includes a processing unit for making a testing device execute the subscriber test on the basis of the test specifying information received via a logical link from the switch, and sending test result information for informing of a result of the test back to the switch by use of specifying information of a message type based on the V5 interface protocol.

5 Claims, 10 Drawing Sheets

SUBSCRIBER TESTING SYSTEM

This is a continuation of Application PCT/JP99/00179, Filed on Jan. 20, 1999, now abandoned.

BACKGROUND OF THE INVENTION

The present invention relates generally to a technology of maintaining an operating a subscriber transmission device (an access node or an access network) connected to a local exchange and incorporating a function of a geographical accommodation area of a subscriber (a subscriber terminal device) managed by this local exchange, and more particularly to a subscriber testing system capable of executing a subscriber test for the subscriber including a subscriber circuit disposed in the access node and a subscriber's line accommodated in the subscriber circuit by making use of a V5 (V5.1, V5.2) interface protocol of a standardization communication protocol.

There is known a switching technology by which a remote device called an access node located far away from a local exchange, accommodates a subscriber line accommodated in the local exchange with a difficulty in terms of distance. The geographical accommodation area of the subscriber managed by the local exchange can be extended by providing the access node.

The same vendor has been developing and providing so far the access node as the remote device with respect to the local exchange on the basis its own specifications. Over the recent years, however, there have been promoted operations for standardizing processing functions of the local exchange and of the access node, and also the communication protocols for defining the communications therebetween. A V5 system (V5 interface protocol) standardized by ITU-T (International Telecommunications Union Telecommunication standardization sector), is known as its typical example.

The standardization in this category enables the local exchange and the access node to be purchased separately, and equipment makers (vendors) to be selected. Further, the common carriers expect that a reduction in costs for investment of the equipment is attained by improving a diversity of the existing devices.

Hence, according to the V5 system, there increased a possibility in which the access node and the local exchange are provided by the equipment makers different from each other.

In the case of using the V5 system described above, when maintaining and operating the local exchange and the access node, especially performing a subscriber test, it is required that the local exchange and the access node be operated in linkage. It is, however, a real situation that the maintenance and operation of the common carriers are based mainly on the local exchange in geometry. Therefore, actualization of the maintenance-and-operation linkage between the access node and the local exchange provided by the different equipment makers, needs a protocol conversion for connecting the local exchange and the access node and also a database for converting subscriber management data. It is therefore inevitable that the software and the added devices are required to be developed.

It follows that a merit of using the V5 system in which the call processing is standardized is decreased by half.

SUMMARY OF THE INVENTION

It is a primary object of the present invention to provide a subscriber testing system capable of performing a subscriber test of a subscriber including a subscriber circuit disposed in an access node and a subscriber's line accommodated in the subscriber circuit by making use of a V5 interface protocol (V5 system) in the standardization communication protocol.

To accomplish the above object, according to one aspect of the present invention, a subscriber testing system comprises a switch accommodating a subscriber and having a maintenance/operation terminal and a communication node connected at a far distance to the switch via a logical link in which a communication protocol is defined, having a function of extending a geographical accommodation area of the subscriber that is managed by the switch, and including a testing device for executing a test for a subscriber's line and subscriber circuit that correspond to the subscriber accommodated therein. In this system, a V5 interface protocol is used as the communication protocol. The switch includes a processing unit for transmitting to the communication node a piece of test specifying information, inputted from the maintenance/operation terminal, for indicating a subscriber test for the subscriber's line and subscriber circuit that correspond to the accommodated subscriber by use of specifying information of a message type based on the V5 interface protocol. The communication node includes a processing unit for making the testing device execute the subscriber test on the basis of the test specifying information received via the logical link from the switch, and sending test result information for informing of a result of the test back to the switch by use of specifying information of a message type based on the V5 interface protocol.

In this architecture, any one of a port control protocol and a PSTN signal protocol of the V5 interface protocol may be used.

Further, when the accommodated subscriber is an analog subscriber, the PSTN signal protocol may be used.

When the accommodated subscriber is a digital subscriber, the port control protocol may be used.

Moreover, a field of an information element subsequent to a field of a message type in the V5 interface protocol may be used for specifying a test type of the subscriber test.

According to the present invention, the subscriber test of the subscriber including the subscriber circuit disposed in the access node and the subscriber's line accommodated in the subscriber circuit, can be conducted by making use of the V5 system (V5.1, V5.2 interface protocols) in the standardization communication protocol. It is therefore possible to remarkably reduce the costs for developing the software and added devices, these developments being required as there arise necessities for a protocol conversion for connecting the access node and the local exchange and a database for converting the subscriber management data.

This makes it feasible to separately purchase the local exchange and the access node, which is a fundamental merit of using the V5 system in which the call processing is standardized. This also enables equipment makers to be selected and further a diversity of the existing devices to be improved. Then, this leads to actualization of a reduction in costs for investment of the equipment as the common carriers desire.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein.

DESCRIPTION OF THE PREFERRED EMBODIMENTS

An embodiment of the present invention will hereinafter be described with reference to the accompanying drawings.

[Architecture of Switching System]

Figure 1:
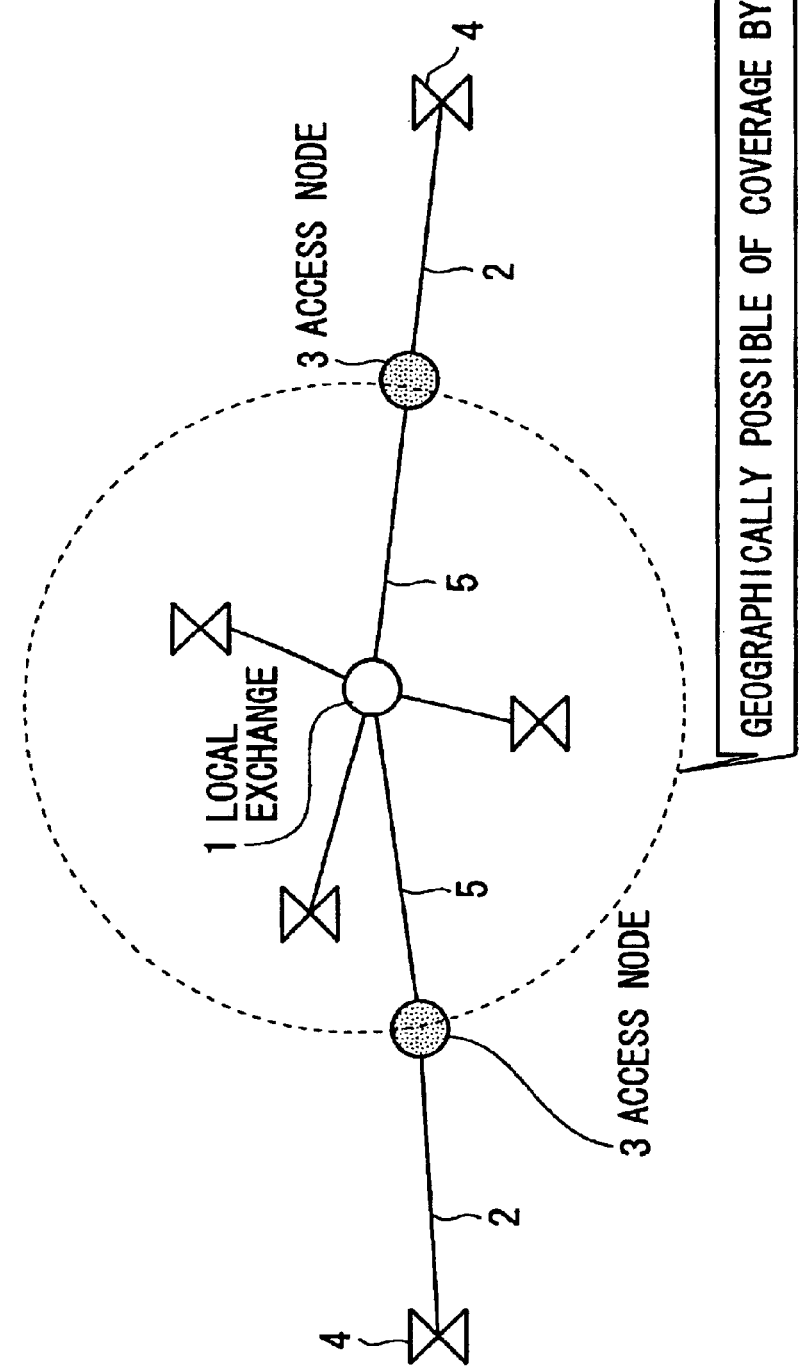
FIG. 1 is a diagram showing a geometrical relationship between a local exchange and an access node in a switching system in one embodiment of the present invention.

In a switching system in one embodiment of the present invention, as shown in FIG. 1, a subscriber's line 2 difficult in terms of distance to be connected to a local exchange (LE) 1, is connected to an access node (AN) 3 known as a remote device located far away from the local exchange 1. A geographical area for covering subscribers (subscriber terminal devices) 4 managed by the local exchange 1 can be extended by providing the access nodes 3.

[Outline of Functions of V5 System]

Figure 2:
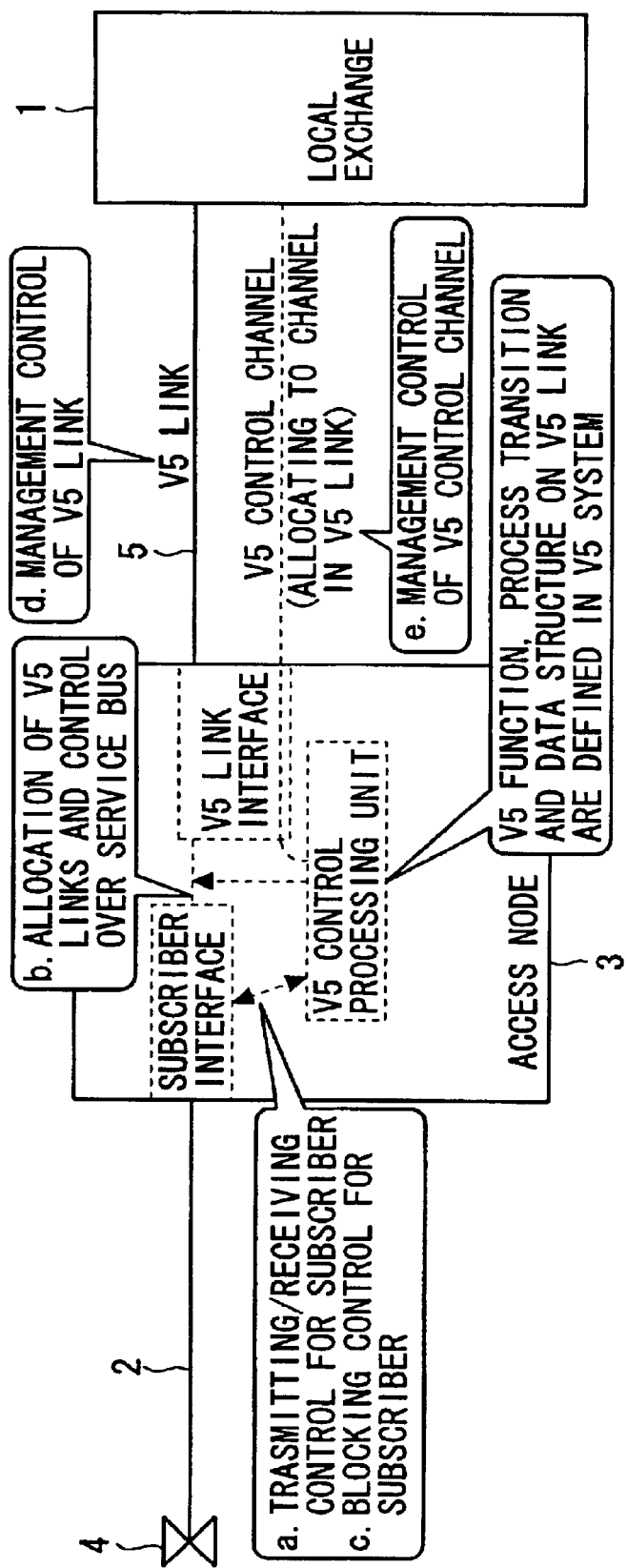
FIG. 2 is a diagram showing an outline of functions of a V5 system.

FIG. 2 shows an outline of functions of a V5 system (V5 interface protocol) of the standardization communication protocols of ITU-T Recommendations, which is applied to the switching system shown in FIG. 1. Referring to FIG. 2, according to the V5 system, process transitions, with respect to the following functions:

a. A transmitting/receiving control for the subscriber 4 (subscriber interface function);

b. a control on allocation of V5 links when calling and called and of a call path on the access node 3 (V5 link interface function;

c. a blocking control for the subscriber 4 (subscriber interface function);

d. a management control on the V5 links (V5 link interface function); and e. a management control on V5 control channels (V5 link interface function, details of the respective function controls and process transitions under the respective function controls, are defined. Further, a data structure on the V5 link is, as will be explained later on, defined on the V5 system.

Those functions of the V5 system are actualized as V5 control processing units (V5 protocol processing units) that operate based on control indications given from the local exchange 1.

A plurality of access nodes 3 of a plurality of makers are connected to the single local exchange 1, and might be provided by a plurality of equipment makers.

According to the V5 (V5.2) system, one V5 link at the minimum and sixteen V5 links at the maximum set extended between the access nodes 3 and the local exchange 1. According to the V5.1 system, only one V5 link is set. Each V5 link is time-divided into 32 time slots (TS0~TS31). The time slot TS0 contains a frame synchronous pattern and trouble information (alarm)/maintenance operation information. The time slots TS15, TS16, TS31 are used for the V5 control channel or for a normal bearer channel for the line user.

Figure 3:
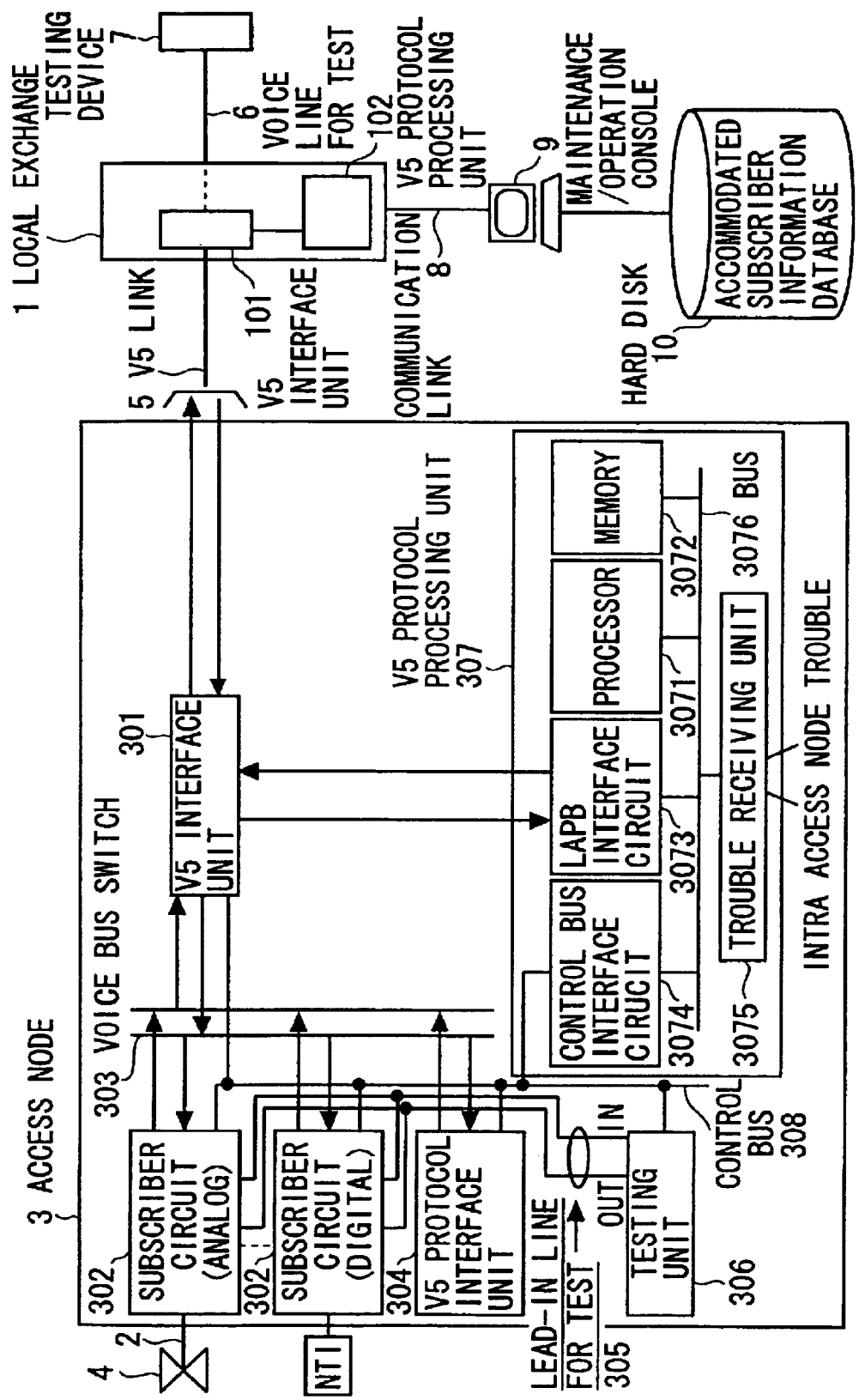
FIG. 3 is a diagram showing a detailed architecture of the switching system shown in FIG. 1.

Next, a detailed architecture of the switching system including the local exchange and the access node will be explained referring to FIG. 3.

[Architecture of Local Exchange]

The local exchange 1 includes a V5 interface unit 101 that terminates the V5 link 5, and a V5 protocol processing unit 102. A testing device 7 is connected via a testing voice line 6 to the local exchange 1. Further, a maintenance/operation console 9 is connected via a communication link 8 to the local exchange 1. The maintenance/operation console 9 includes a hard disk 10 containing an accommodated subscriber information database. Note that the testing device 7 and the maintenance/operation console 9 are normally disposed in the same local zone as the local exchange 1.

The V5 protocol processing unit 102 can be actualized as what has substantially the same configuration as a V5 protocol processing unit 307 within the access node 3 that will be explained alter on. The V5 protocol processing unit 102 is, though not illustrated, constructed of a variety of interface circuits, a microprocessor and a memory.

The maintenance/operation console 9 can be actualized as what has the same architecture as a personal computer and a workstation, and is, though not illustrated, constructed of a variety of interface circuits such as a LAPB interface circuit and a hard disk interface circuit for controlling the hard disk, a microprocessor and a memory. The maintenance/operation console 9 is connected to the lock exchange 1 by the communication link 8 via the LAPB interface circuit. Note that the maintenance/operation console 9 operates under the control of an operating system capable of multi-task processing.

The hard disk 10 is stored with a latest application program for a software download process to each access node 3 that will be explained later on, and an initialization information database for an access node V5 system initialization process that will hereinafter be described.

[Architecture of Access Node]

The access node 3 connected to the V5 link 5 to the local exchange 1 includes a V5 link interface unit 301 terminating the V5 link 5, and a subscriber circuit (digital:ISDN) 302 that accommodates a subscriber circuit (analog) 302 and a digital terminating circuit NT1. Each subscriber circuit 302 and the V5 link interface unit 301 are connected to each other by a voice bus switch 303. The voice bus switch 303, at which the lines of user channels concentrate, performs switching thereof.

The V5 interface unit 301 relays the line user bearer channel in the V5 link 5 between the subscriber circuit 302 and the local exchange 1. In addition, the V5 interface unit 301 relays subscriber transmitting/receiving control information, line concentration switch control information, and blocking/non-blocking control information on the subscribers and on the V5 links by use of the V5 control channels of the time slots TS15, TS16, YS31 between the V5 protocol interface unit 304 and the local exchange 1.

The subscriber circuit 302 is connected via a lead-in line 305 for testing in order to test electric characteristics of the subscriber circuit 302 and of the subscriber's line.

In the V5 protocol processing unit 307, a microprocessor 3071, a memory 3072, a LAPB (LAPV5) interface circuit 3073, a control bus interface circuit 3074 and a trouble receiving unit 3075, are connected to each other via a bus 3076.

The trouble receiving unit 3075 receives trouble information (alarm) detected by, through not particularly illustrated, a piece of hardware. The control bus interface circuit 3074 is connected via a control bus 308 to the V5 link interface unit 301, each subscriber circuit 302, the V5 protocol interface unit 304 and the testing unit 306.

The microprocessor 3071 and the memory 3072 communicate information on the maintenance and operation, especially a subscriber test with the local exchange 1 via the LAPB interface circuit 3073 and the V5 interface unit 301. This item information contains the trouble information received by the trouble receiving unit 3075 and control information in various categories that are communicated between the control bus interface circuit 3074 and each of the V5 link interface unit 301, each subscriber circuit 302, the V5 protocol interface unit 304 and the testing unit 306.

[Software Download Process]

In the switching system architecture described above, the maintenance/operation console 9 is capable of always downloading the latest application program into the access node 3 controlled by the console 9. The hard disk 10 within the maintenance/operation console 9 is previously stored with the latest application program for the access node 3. Therefore, a maintainer if desiring to download the software into a certain specified access node 3, designates this access node 3 in the maintenance/operation console 9 and indicates the console 9 to download the software. As a result, the application program that should be downloaded is transferred to the target access node 3 via the local exchange 1 and the V5 link 5 from the hard disk 10 in the maintenance/operation console 9. Then, the thus transferred application program is accumulated in the unillustrated memory within the access node 3.

[Initialization Process of V5 System of Access Node]

When booting the access node 3, it is required that the access node 3 be initialized. This initializing process can be executed from the maintenance/operation console 9. Namely, when booting the access node 3, unique initialization information that must be given to the access node 3 can be specified from the maintenance/operation console 9. The initialization information is categorized into ID information of the access node 3, V5 related interface unit accommodating information (containing port information), subscriber accommodating information (containing a mapping table of a logical ID to a physical port), V5 link accommodating information, and V5 control channel accommodating information.

These pieces of information are inputted basically from the maintenance/operation console 9 and, after receiving a data check, stored as an initialization information database in the hard disk 10 in the maintenance/operation console 9.

It is of much importance for the access node V5 system initialization process that the subscriber accommodating information and the various items of V5 related information are required to be set to the access node 3 in synchronization with the local exchange 1, and that conformities of contents of those pieces of information are kept.

Further, in the access node V5 system initialization process, some pieces of the subscriber accommodating information, the V5 link accommodating information and the V5 control channel information, need procedures such as being specified by the local exchange 1 and further adding information of the access node 3 to this specified item of information. In this case, the related database set by the local exchange 1 is transmitted to the maintenance/operation console 9 by use of the communication link 8.

The maintainer adds, edits and processes necessary pieces of data with respect to the content of the related database, and thereafter notifies the target access node 3 of result data thereof. Then, the same data are stored as the initialization information database in the hard disk.

[Alarm Related Process]

The trouble information (alarm) occurred in the access node 3 described above is detected by the trouble receiving unit 3075 of each access node, and written by the microprocessor 3071 to an alarm bitmap table stored in the memory 3072. A physical link-basis alarm and unit-basis alarm within the access node are indicated in this alarm bitmap table. The alarm is categorized depending on a degree of urgency into a critical alarm, a major alarm and so on. With the alarm detected in the access node 3, bit data in a bit location corresponding to the detected alarm in the alarm bitmap table corresponding to the category corresponding to the detected alarm, is updated, Given next is an explanation of a case of performing a subscriber test for the subscriber circuit disposed in the access node, including the subscriber's line accommodated in this subscriber circuit in the switching system shown in FIG. 3.

This switching system involves the use of the V5 interface protocol for controlling call originating and receiving operations of the subscriber 4. Tests for PSTN (Public Switched Telephone Network (analog)) subscriber's line and circuit and for ISDN (Integrated Services Data Network (digital)) subscriber's line and circuit, are conducted by using the existing protocols, whereby the number of processes for developing the software and new devices can be reduced.

[Analog Subscriber Test]

In the case of testing the subscriber's line 2 to which the PSTN-based analog subscriber 4 is connected and also the subscriber circuit 302 accommodating this subscriber's line 2, the PSTN Signaling Protocol is used. This PSTN Signaling Protocol is defined as a protocol for informing of results of transfer/receipt of off- and on-hook signals from the telephone, a response signal to the telephone and an accounting signal via the V5 link.

Figure 4:
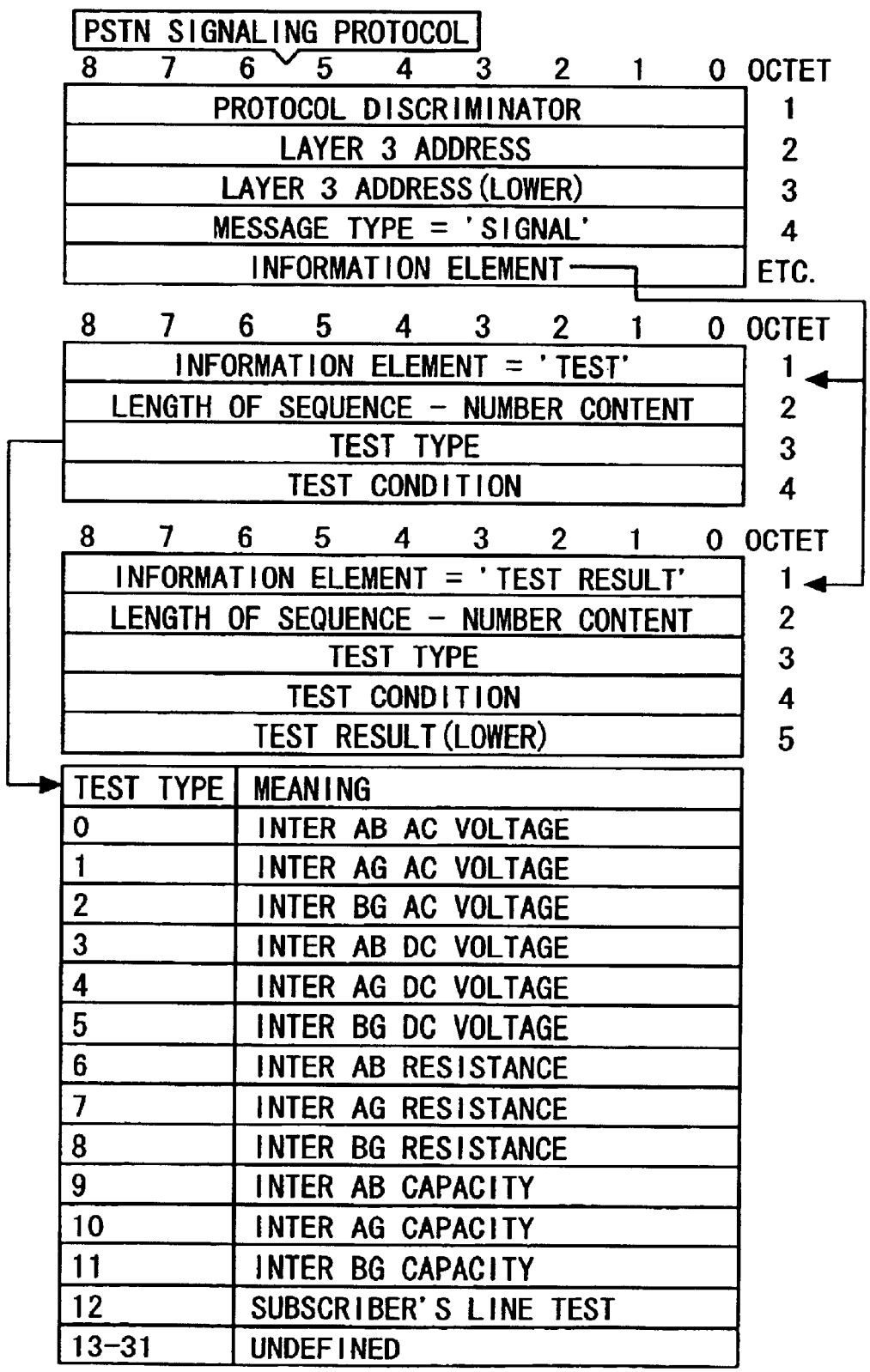
FIG. 4 is a diagram showing a structure of a PSTN signaling protocol.

FIG. 4 shows a structure of the PSTN Signaling Protocol, wherein [signal] of Message Type is used for this subscriber test. A [signal] message is used for informing the local exchange 1 of a state of the PSTN subscriber's line or for giving a command that a transmission path state defined in the access node 3 be established. Further, [test] and [test result] are added as information elements.

The information element [test] indicates that the local exchange 1 makes a test request to the access node 3. Then, FIG. 4 shows definitions of categories of test as test types of this [test] signal. Further, "test condition" of [test] signal is a piece of information for indicating whether or not the test is conducted during the speech.

An information element [test result] is a piece of information for the access node 3 to notify the local exchange 1 of a result of the test. This piece of information [test result] indicates a content of the test result or a failure of the test.

Figure 5:
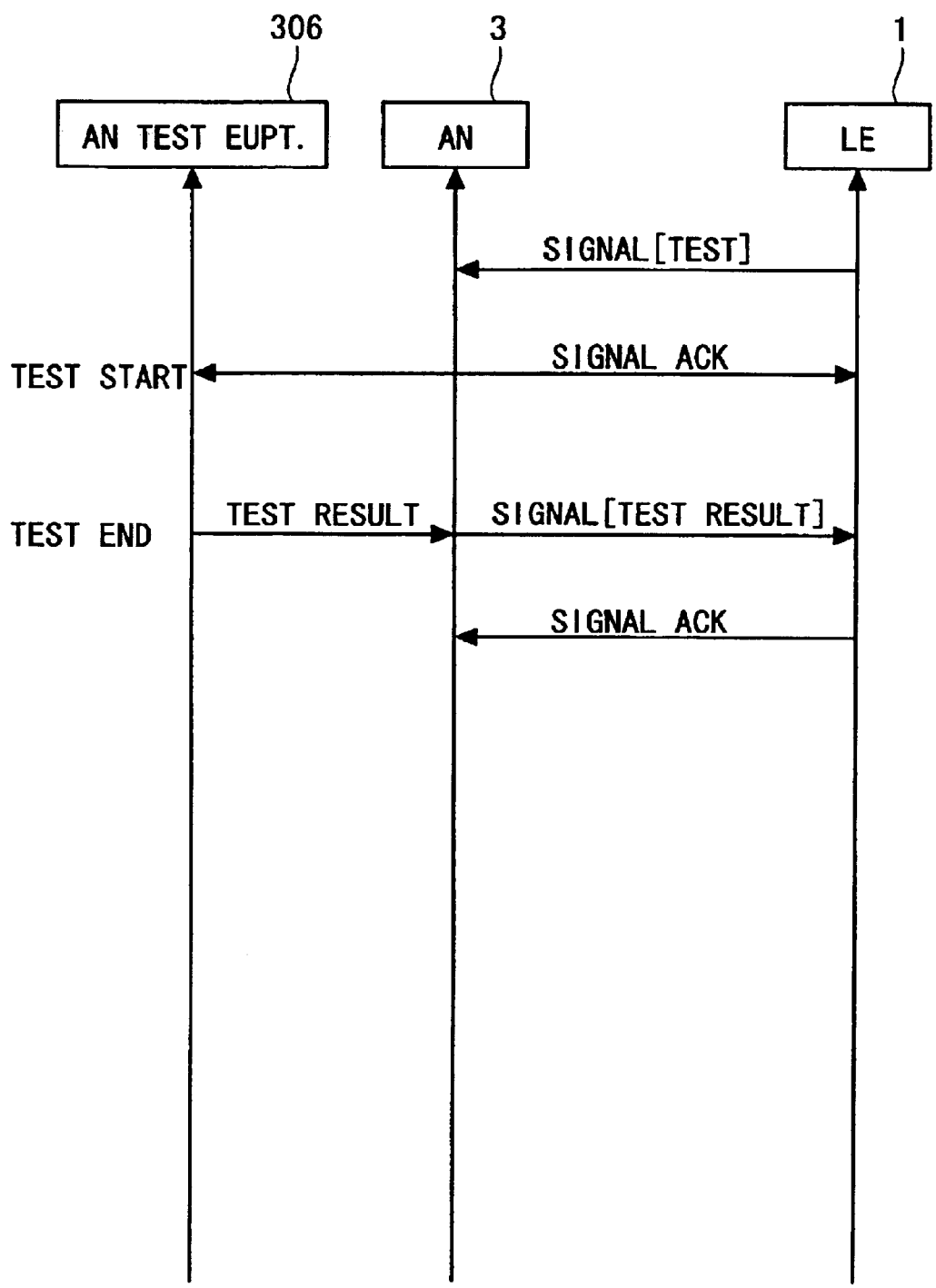
FIG. 5 is a diagram showing a message flow when testing a subscriber's line and a subscriber circuit of a PSTN subscriber.

The access node (AN) 3, upon receiving [test] signal from the local exchange (LE) 1, sends Signal ACK back to the LE 1, and the testing unit 306 executes the test about indicated items of the user port indicated. The access node 3, when the test finishes after being informed of the result from the testing unit 306, transmits a [test result] signal back to the local exchange 1. The local exchange 1, when receiving this signal, sends Signal ACK back to the access node 3. FIG. 5 shows a flow of this message.

What has been described so far is the case where PSTN Signal Protocol is applied to the subscriber test, however, the Port Control Protocol may also be used as in the case of the next digital subscriber test.

[Digital Subscriber Test]

This switching system using the V5 system, in the case of the ISDN based digital subscriber, involves the use of the Control Protocol unlike the PSTN based analog subscriber. This Control Protocol is used for the blocking control of the user port even in PSTN.

Accordingly, when testing the subscriber's line 2 to which the ISDN based digital subscriber is connected and also the subscriber circuit 302 accommodating this subscriber's line 2, the Port Control Protocol of the Control Protocol is used.

Figure 6:
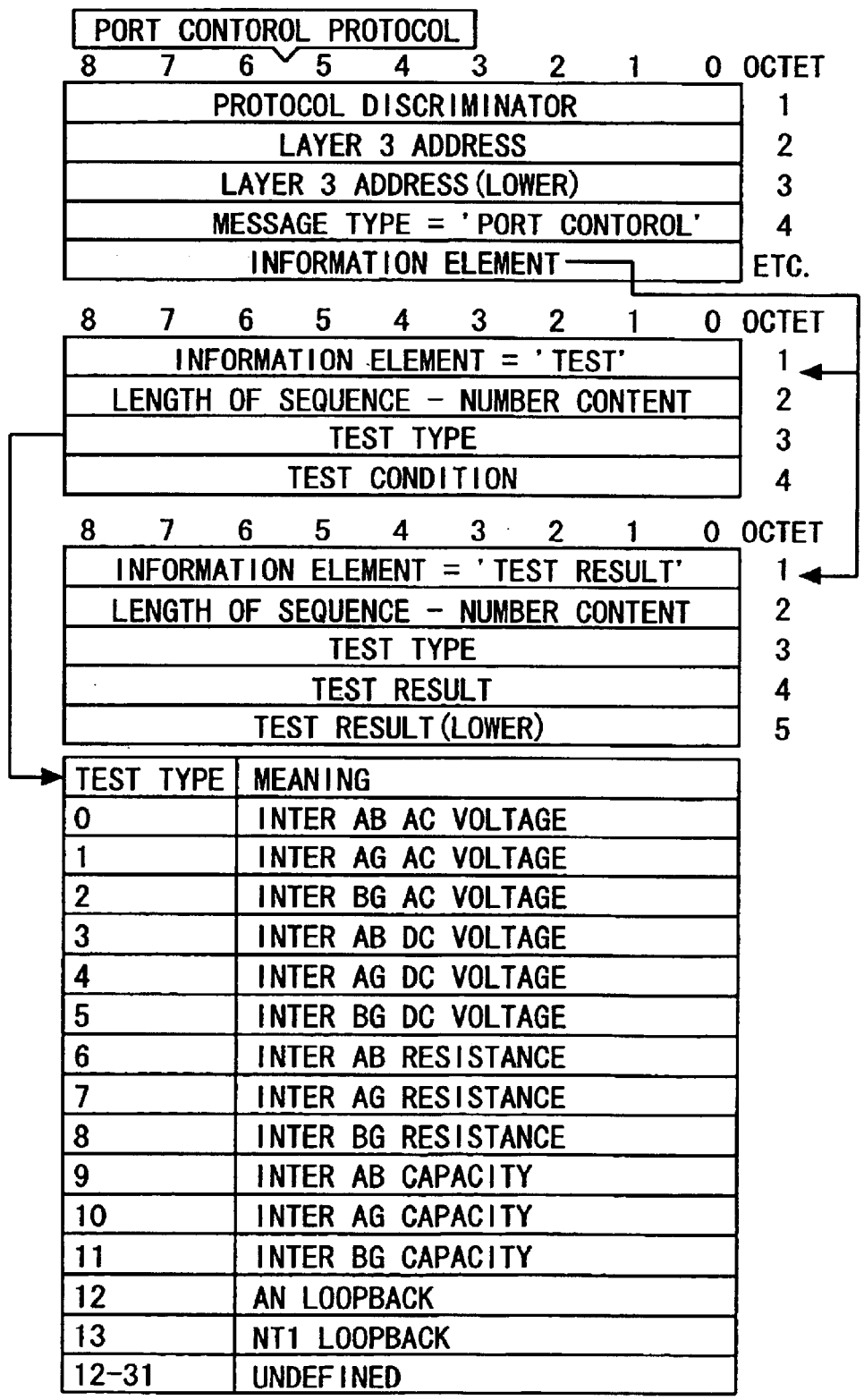
FIG. 6 is a diagram showing a structure of a port control protocol.

FIG. 6 shows a structure of the Port Control Protocol, wherein Message type [port control] is used for this subscriber test. The [port control] message is used for transmitting the information to the access node 3 from the local exchange 1, and vice versa. Further, [test] and [test result] are added as information elements.

The information element [test] indicates that the local exchange 1 makes the test request to the access node 3. Then, for example, FIG. 6 shows definitions of test types of this [test] signal. Further, "test condition" of [test] signal is a piece of information for indicating whether the test is conducted during the speech, and also functions to notify of the control or restoration in the case of a loopback command.

The information element [test result] is a piece of information the access node 3 to notify the local exchange 1 of a result of the test. This piece of information [test result] indicates a content of the test result or a failure of the test as well as indicating that the control or restoration is completed in the case of the loopback.

Figure 7:
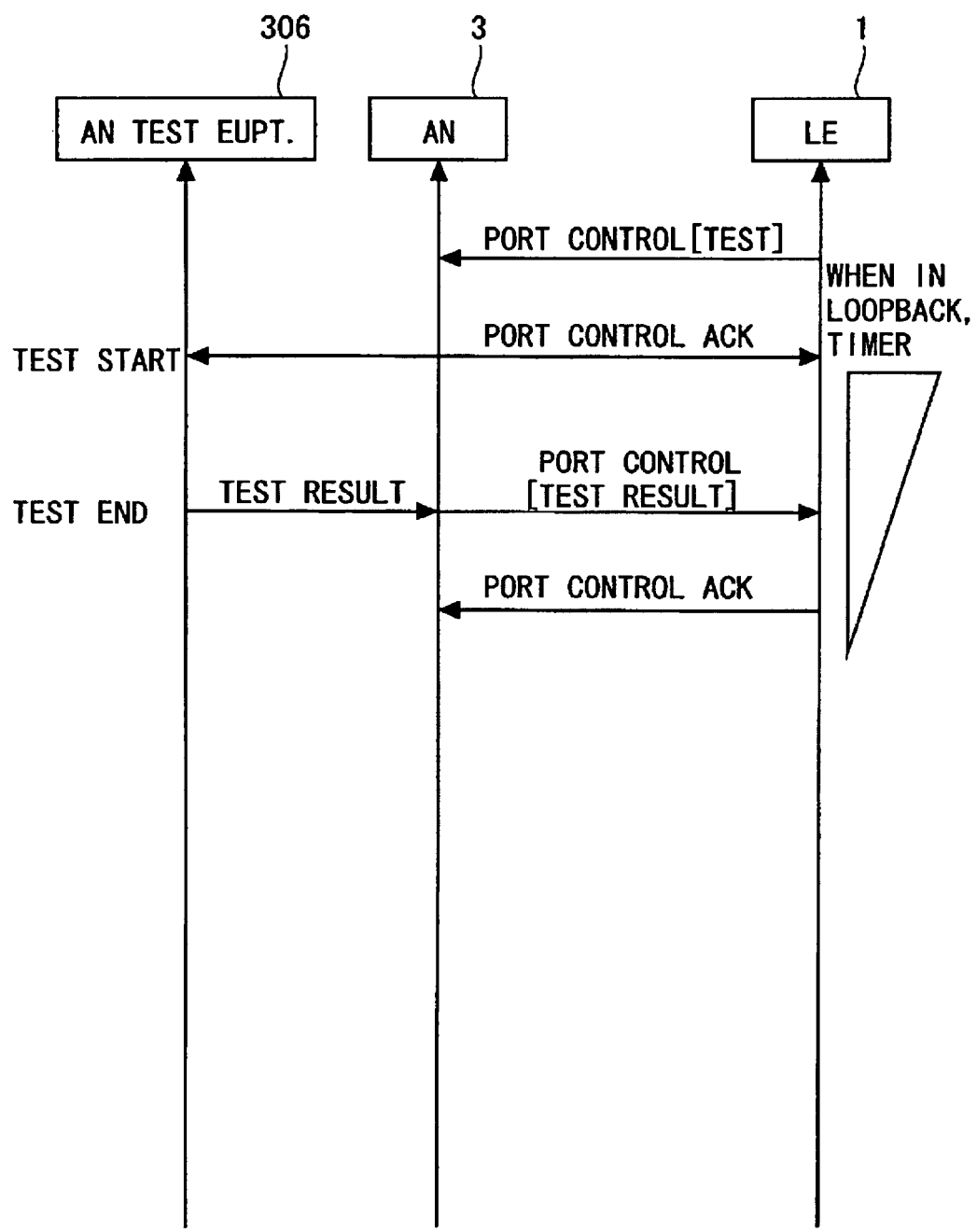
FIG. 7 is a diagram showing a message flow when testing the subscriber's line and the subscriber circuit of an ISDN subscriber.

The access node (AN) 3, upon receiving [test] signal from the local exchange (LE) 1, sends Signal ACK back to the LE 1, and the testing unit 306 executes the test about indicated items of the user port indicated. The access node 3, when the test finishes after being informed of the result from the testing unit 306, transmits the [test result] signal back to the local exchange 1. The local exchange 1, when receiving this signal, sends Signal ACK back to the access node 3. Note that if the a canceling command with respect to the loopback test does not come, the restoration is made with a timeout of the timer, and the access node 3 sends a notification of being restored back to the local exchange 1. FIG. 7 shows a flow of this message.

[Processing Steps of Subscriber Test]

The subscriber test such as the subscriber's line/subscriber circuit test is implemented as the maintenance/operation console 9 of the local exchange 1 specifies. The subscriber test is categorized into an auto test and a manual test. The auto test is defined as a mode in which a specified item of manual test is effected on a plurality of subscribers, and is implemented by the software on the maintenance/operation console 9. This corresponds to an auto repetition of the manual test. The manual test is a mode in which a telephone number is inputted from the maintenance/operation console 9, and the items in the test type (see FIGS. 4 and 6) are implemented by the software upon the test target subscriber.

Figure 8:
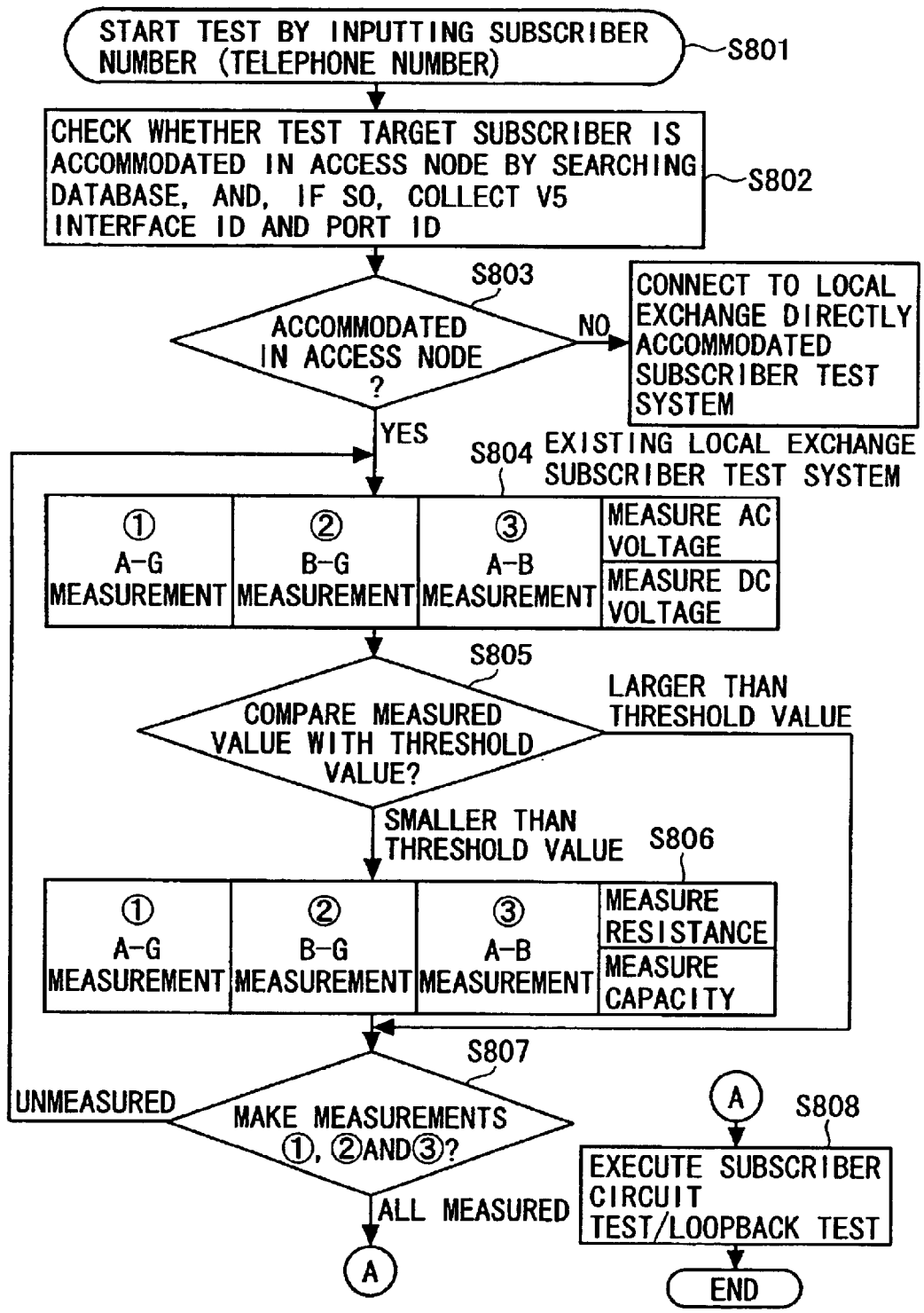
FIG. 8 is a flowchart showing an outline of processing steps for the subscriber test.

To start with, FIG. 8 shows a flow of whole processing steps of the subscriber test. Referring to FIG. 8, the maintainer starts the test by inputting the subscriber number (telephone number) from the maintenance/operation console 9 (step S801). The maintenance/operation console 9 searches the database 10 and thus judges whether the test target subscriber is a subscriber accommodated in the access node 3. If accommodated, the maintenance/operation console 9 collects a V5 interface ID and a port (user port) ID (S802).

Whereas if the test target subscriber is not accommodated in the access node, the operation diverts to a process in a local exchange directly accommodated subscriber testing system (S803). If accommodated in the access node, items of voltage measuring test are conducted (S804).

The maintenance/operation console 9 compares a measured value of the voltage with a threshold value. If the measured value is larger than the threshold value, the operation proceeds to a process in S807 (S805). Whereas if smaller than the threshold value, items of a resistance measurement and a capacity measurement are carried out (S806).

The measurement is repeated till the items of the measurements between all the lines are conducted (S807). If measured all, the operation comes to an end after implementing the subscriber circuit test in the case of the analog subscriber (S808). By contrast, in the case of the digital subscriber, a loopback test takes place in S808.

Figure 9:
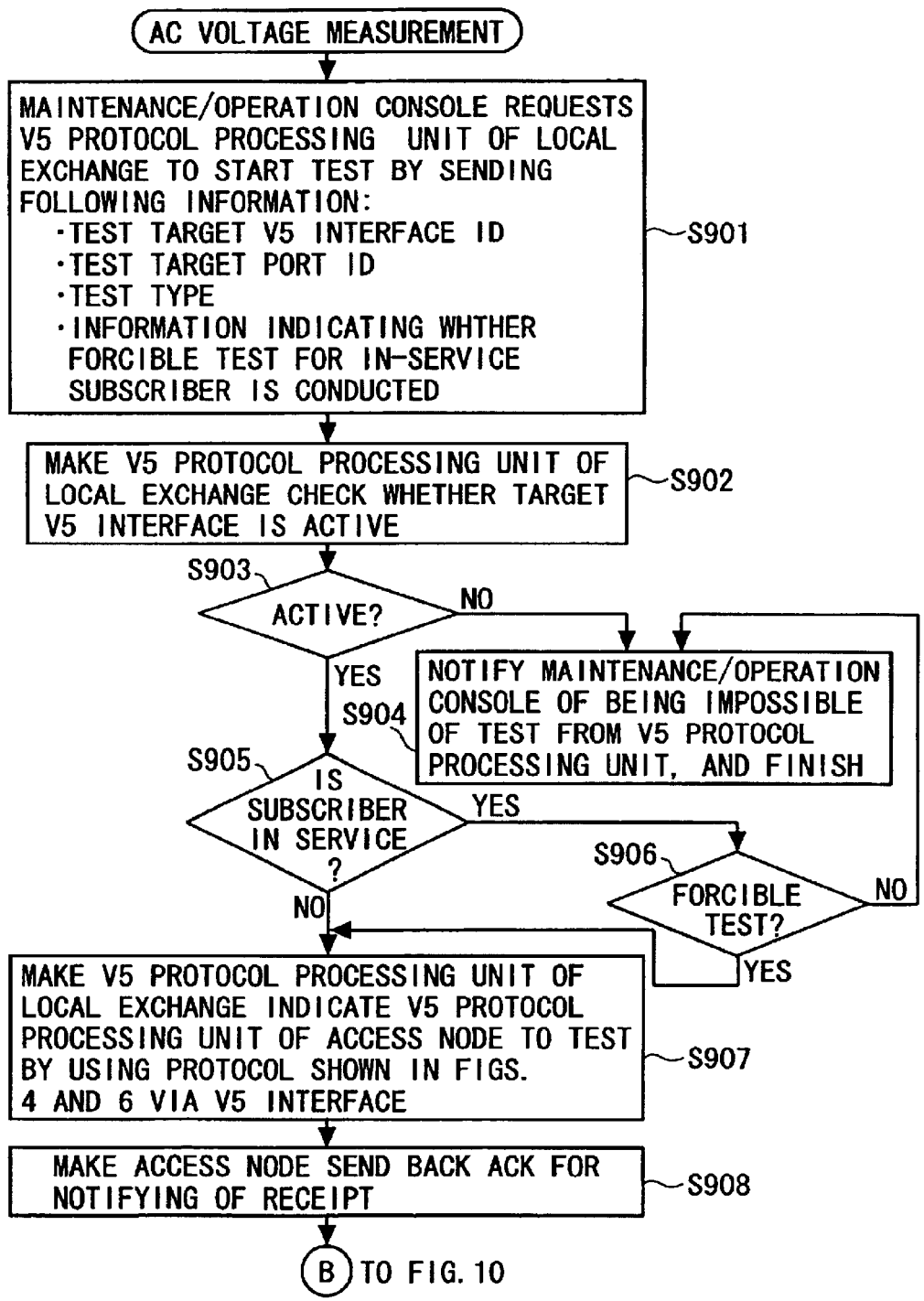
FIG. 9 is a flowchart showing details of the processing steps for the subscriber test.
Figure 10:
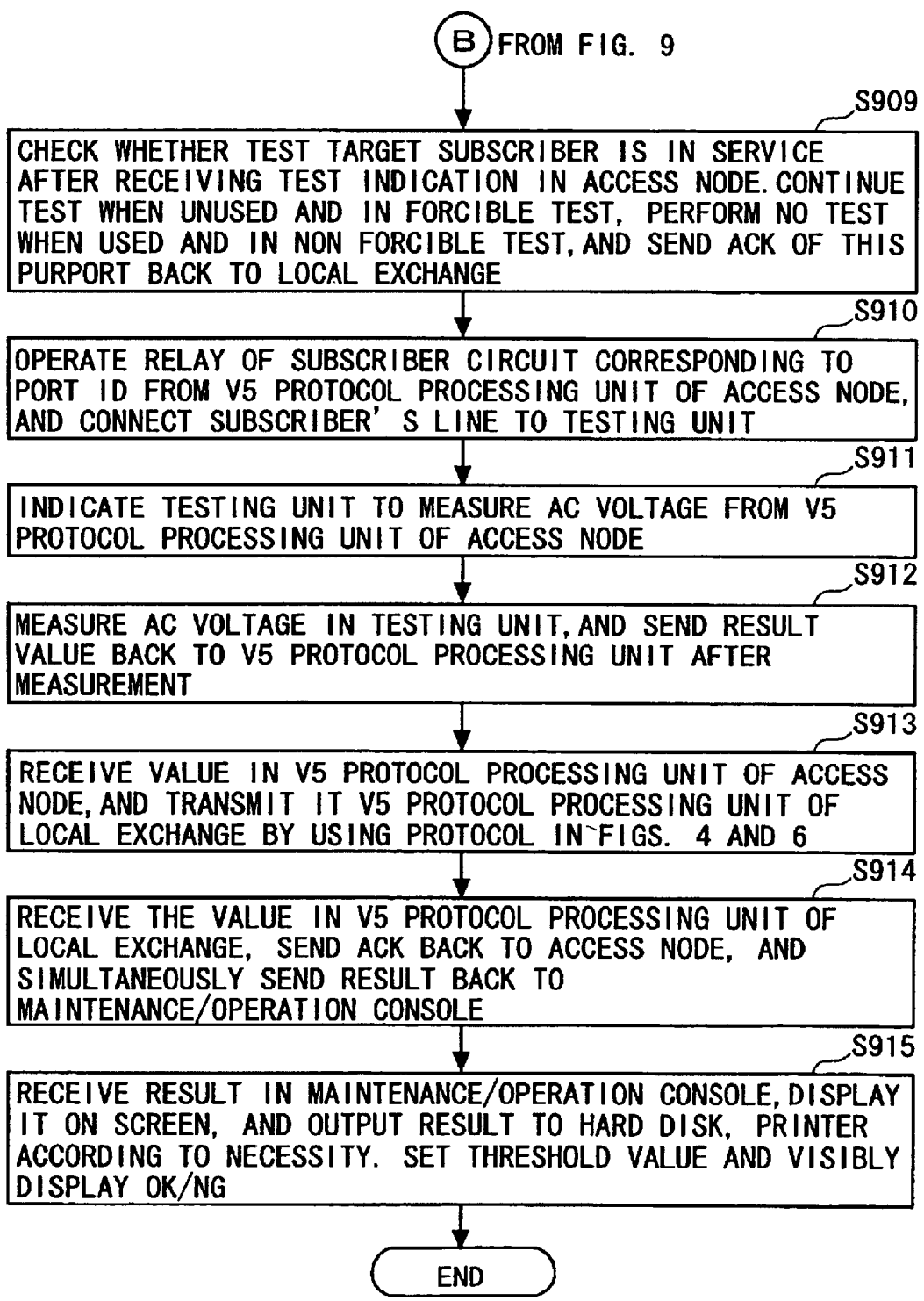
FIG. 10 is a flowchart showing details of the processing steps for the subscriber test.

Subsequently, the processing steps will be explained in depth by exemplifying an AC voltage measurement of the subscriber's line 2 in which the analog subscriber 4 is accommodated in the subscriber circuit 302. The discussion will be made in conjunction with FIGS. 9, 10 and 3. The maintenance/operation console 9 sends the following information to the V5 protocol processing unit 102 of the local exchange 1, and makes a request for starting the test (step S901).

V5 interface ID of the test target,

User port ID of the test target,

Test type (Itemization by test types): Data corresponding to the test types 0, 1, 2 etc based on the protocol shown in FIG. 4 in this example, and Information indicating whether a forcible test with respect to an in-service subscriber is conducted or not.

The V5 protocol processing unit 102 requested by the maintenance/operation console 9 to start the test, checks whether the target V5 interface is active or not (S902).

If not active, the V5 protocol processing unit 102 notifies the maintenance/operation console 9 that the test can not be conducted (S903, S904). Whereas if active, the V5 protocol processing unit 102 judges whether or not the test target subscribed is on the speech (S905).

If the test target subscriber is on the speech, the V5 protocol processing unit 307 judges whether or not the subscriber is a forcible test target. If not the forcible test target, the operation proceeds to a process in S904. Whereas if judged to be the forcible test target, the operation proceeds to a process in S907 (S905, S906). Note that the judgement in S905 and S906 may also be made by the V5 protocol processing unit 307 of the access node 3.

The V5 protocol processing unit 102 indicates the V5 protocol processing unit 307 of the access node 3 through the V5 interface unit 101 to test the subscriber's line on the basis of the protocol shown in FIG. 4 (S907).

The V5 protocol processing unit 307 of the access node 3 sends ACK for notifying of a receipt of [test] signal back to the local exchange 1 via the V5 link interface unit 301 (S908).

The V5 protocol processing unit 307, after receiving the test indication, at first checks an in-service (on-speech) state of the test target subscriber. The test continues when not in service or in the forcible test but does take place when in service and being a non forcible test target, and ACK indicating this purport is sent back to the local exchange 1 (S909).

The V5 protocol processing unit 307 operates a relay of the subscriber circuit 302 corresponding to the port ID from the V5 protocol interface unit 304 to connect the subscriber's line 2 to the testing unit 306 (S910).

The V5 protocol processing unit 307 indicates the testing unit 306 to measure an AC voltage (S911). The testing unit 306 measures the AC voltage of the test target subscriber's line, and sends a measured value back to the V5 protocol processing unit 307 (S912).

The V5 protocol processing unit 307 receives this measured value from the testing unit 306, and transmits it to the V5 protocol processing unit 102 of the local exchange 1 in accordance with [test result] in the protocol shown in FIG. 4 (S913).

The V5 protocol processing unit 102 of the local exchange 1 receives [test result] via the V5 interface unit 101, then sends ACK back to the access node 3, and transmits the result to the maintenance/operation console 9 (S914).

The maintenance/operation console 9 receives the result, then displays it on the screen, and outputs the same result to the hard disk and the printer as the necessity may arise. Further, the maintenance/operation console 9 sets a threshold, and visibly displays OK or NG about a result of comparison with the threshold value (S915).

If the subscriber test needs a dialog between the testing device 7 in the local exchange 1 and the test target subscriber 4, the test target subscriber 4 is connected by use of BCC (Bearer Channel Connection) protocol of the V5 system to the voice line 6 for testing in the local exchange 1, to which the testing device 7 is connected.

As discussed above, when the V5 interface protocol (V5 system) for call processing is used for the subscriber test, the processing can be executed at the high speed, wherein the test can be conducted in the same testing time (on the order of several seconds per subscriber) as in the exchange directly accommodated subscriber test.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A subscriber testing system comprising:
   a switch accommodating a subscriber and having a maintenance/operation terminal; and
   a communication node connected at a far distance to said switch via a logical link in which a communication protocol is defined, having a function of extending a geographical accommodation area of the subscriber that is managed by said switch, and including a testing device for executing a test for a subscriber's line and subscriber circuit that correspond to the subscriber accommodated therein,
   wherein a V5 interface protocol is used as the communication protocol,
   said switch includes a processing unit for transmitting to said communication node a piece of test specifying information, inputted from said maintenance/operation terminal, for indicating a subscriber test for the subscriber's line and subscriber circuit that correspond to the accommodated subscriber by use of specifying information of a message type based on the V5 interface protocol, and
   said communication node includes a processing unit for making said testing device execute the subscriber test on the basis of the test specifying information received via said logical link from said switch, and sending test result information for informing of a result of the test back to said switch by use of specifying information of a message type based on the V5 interface protocol.

2. A subscriber testing system according to claim 1, wherein any one of a port control protocol and a PSTN signal protocol of the V5 interface protocol is used.

3. A subscriber testing system according to claim 2, wherein when the accommodated subscriber is an analog subscriber, the PSTN signal protocol is used.

4. A subscriber testing system according to claim 2, wherein when the accommodated subscriber is a digital subscriber, the port control protocol is used.

5. A subscriber testing system according to claim 1, wherein a field of an information element subsequent to a field of a message type in the V5 interface protocol is used for specifying a test type of the subscriber test.

* * * * *